Aug. 15, 1939  W. A. MORTON  2,169,426
COMPOSITE TUMBLER
Filed Oct. 14, 1936   2 Sheets-Sheet 2

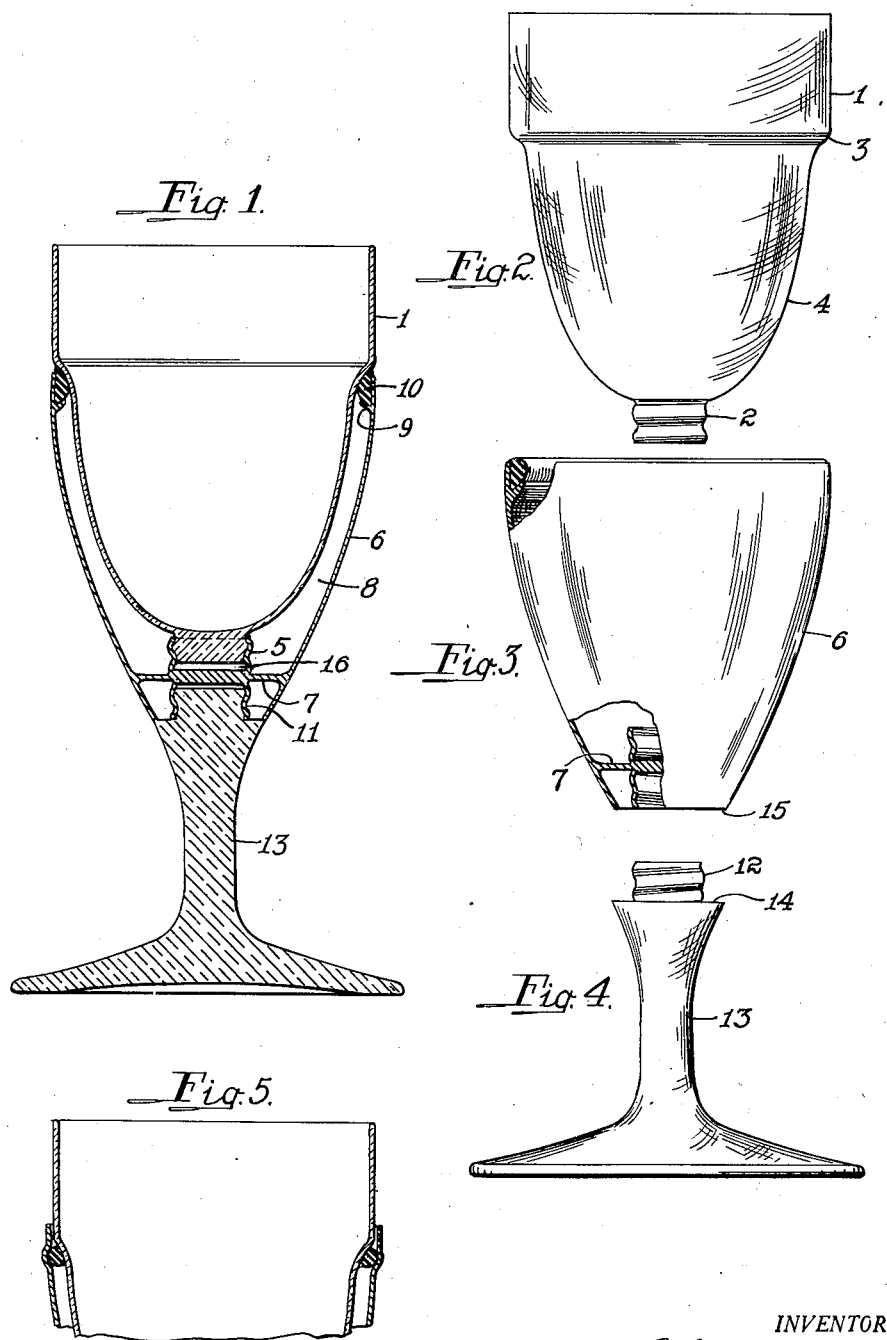

INVENTOR
William A. Morton
by William B. Jaspert
Attorney.

Patented Aug. 15, 1939

2,169,426

UNITED STATES PATENT OFFICE 2,169,426

COMPOSITE TUMBLER

William A. Morton, Mount Lebanon, Pa., assignor to Amco, Incorporated, Pittsburgh, Pa., a corporation of Pennsylvania Application October 14, 1936, Serial No. 105,526

3 Claims. (Cl. 65—66)

This invention relates to new and useful improvements in tumblers, it being among the objects thereof to provide a new and practical form of composite tumbler construction of glass and metal which shall be highly ornamental, relatively inexpensive, heat insulating and having a nonsweating exterior. It is still another object of the invention to provide a composite tumbler construction in which the parts are replaceable when damaged, broken or exchangeable when it is desired to alter the color combination of its component parts.

Figure 6:
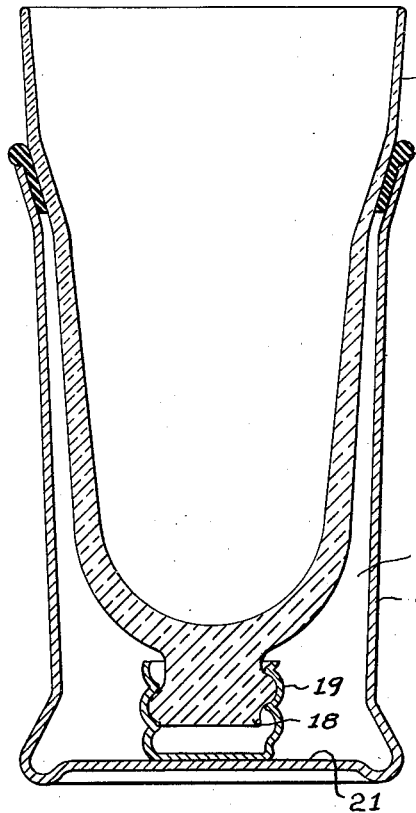
Figure 7:
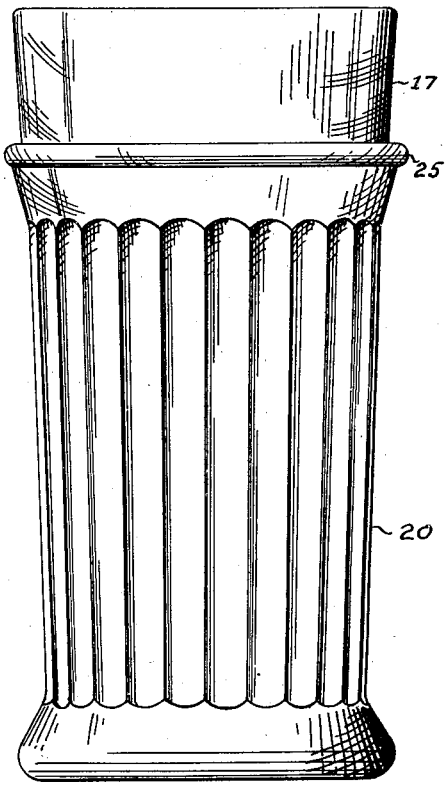

These and other objects of the invention will become more apparent from a consideration of the accompanying drawings constituting a part hereof in which:

Fig. 1 is a vertical cross-sectional view of a composite tumbler embodying the principles of this invention;

Fig. 2 a side elevation of the glass tumbler portion;

Fig. 3 a sectional elevation of the metallic body portion;

Fig. 4 a side elevation of a foot or base portion;

Fig. 5 a cross-sectional view of a portion of the tumbler and housing showing a modified form of the sealing means;

Fig. 6 a vertical cross-sectional view of a modified form of tumbler embodying the principles of this invention; and Fig. 7 a side elevational view thereof.

As shown in the several figures of the drawings, the tumbler 1 is preferably constructed of glass with a screw-shaped stem 2, the upper portion in the design shown being of cylindrical form and diverging at a shoulder 3 to a substantially egg-shaped body 4. The screw thread portion 2 of the tumbler body 1 is adapted to coact with the threaded portion 5 of a sheet metal hollow body 6 having a web portion 7 to form an inert air space 8 between the body 6 and the outer wall of the tumbler 1. The upper portion of the metallic member 6 is provided with a shoulder 9 for engaging a washer 10 of resilient material such as rubber or cork, which constitutes a seal when in engagement with the shoulder 3 of the tumbler.

The base of the sheet metal member 6 is provided with a screw thread ferrule 11 for receiving the threaded portion 12 of the tumbler foot 13, which is also preferably made of glass or any other suitable material, and which is provided with a shoulder 14 for engagement with the lower edge 15 of the sheet metal member 6.

The screw thread ends 2 and 12 of the tumbler and foot are preferably shorter than the screw thread portion 5 and 11 of the metallic member 6 to provide clearance space 16, as shown in Fig. 1 to assure proper seating of the tumbler 1 and tumbler foot. By drawing-up the screw threaded elements of the tumbler 1 and member 6, the resilient seating portion 10 will effect a hermetically sealed joint between the tumbler and the metal element 6, thereby constituting the space within the metallic member 6 a sealed compartment 8 in which no circulation of air can result from temperature differences between the outside of the metal housing 6 and the inside of the tumbler body to prevent sweating of the outer body of the container when liquids having temperatures differing greatly from atmospheric temperatures are contained therein.

In the modified form of tumbler shown in Figs. 6 and 7, a glass tumbler 17 is provided with a threaded end 18 that interacts with a threaded ferrule 19 of a receptacle 20. The ferrule 19 is integrally formed or attached to the receptacle at its base 21. The tumbler wall 17 is curved for a substantial portion of its length and the wall of receptacle 20 is substantially straight to provide a space 22 therebetween. A tapered portion 23 of the tumbler cooperates with a flared portion 24 of the receptacle to receive a sealing member 25 of rubber or other resilient material. By screwing the end 18 of the tumbler down into the threads of the ferrule 19, the sealing member is compressed to hermetically seal the space or chamber 22.

It is apparent that by the hereinbefore described tumbler construction, various pleasing effects are obtainable. Thus the tumbler 1 and foot 13 can be made of different colored glass, such as amber and blue or crystal and amber and blue, or any desired combination, while the metal element 6 can be highly polished or dull finished and made of any suitable metal or other materials.

By providing the sealed compartment around a substantial portion of the tumbler, the fluid content of the tumbler is maintained at the temperatures in which it is placed in the tumbler for a relatively long period of time. Furthermore, the air space of the metal body portion will prevent the forming of a condensate on the exterior thereof, leaving it dry to handle in hot and humid atmospheres.

Although one embodiment of the invention has been herein illustrated and described, it will be apparent to those skilled in the art that various modifications may be made in the details of construction without departing from the principles herein set forth.

I claim:

1. A composite tumbler comprising a body of glass having a threaded portion, a metallic receptacle having engagement with the threaded portion thereof and having a wall coextensive with a substantial portion of the tumbler out of contact therewith, and resilient material interposed between the lip of the receptacle wall and the outer wall of the tumbler to seal the space between the receptacle and tumbler when they are joined at their threaded portions.

2. A composite tumbler comprising a body portion of glass, a metallic receptacle adapted for locking engagement with a portion of the tumbler and having a wall coextensive with a substantial portion of the tumbler out of contact therewith, and sealing means interposed between the metallic receptacle and tumbler body and being effective upon the locking engagement of the metallic receptacle and tumbler to form a sealed space therebetween, and a glass foot for said tumbler adapted for interlocking with the receptacle member to constitute the tumbler receptacle and foot a unitary structure.

3. A composite tumbler comprising a metallic housing having an inner wall for engagement with a glass tumbler of complementary shape and having a transverse wall adjacent the bottom thereof, a threaded ferrule extending above and below said transverse wall, said housing having a radially extending shoulder below the top thereof, a tumbler having a portion of its outer wall shaped complementary to the inner wall of the housing and having a threaded stem for engagement with the upper ferrule of the housing member, a base for abutting the housing member having a screw threaded projection for engagement with the lower ferrule, and a gasket of resilient sealing material interposed between the tumbler and housing walls and abutting the shoulder adjacent the top of the housing, said tumbler housing and base when assembled constituting a unitary member and with said sealing material constituting the space between the housing walls a sealed chamber when assembled.

WILLIAM A. MORTON.